United States Patent
McCrory

(10) Patent No.: US 8,888,101 B1
(45) Date of Patent: Nov. 18, 2014

(54) CARD TABLE

(71) Applicant: Glenn McCrory, Warwick, RI (US)

(72) Inventor: Glenn McCrory, Warwick, RI (US)

(*) Notice: Subject to any disclaimer, the term of this patent is extended or adjusted under 35 U.S.C. 154(b) by 0 days.

(21) Appl. No.: 13/949,353

(22) Filed: Jul. 24, 2013

(51) Int. Cl.
  *A63F 13/08* (2006.01)
  *A63F 1/00* (2006.01)
  *A63F 1/06* (2006.01)
  *G07F 17/32* (2006.01)
  *A63F 3/00* (2006.01)

(52) U.S. Cl.
  CPC ............. *A63F 1/067* (2013.01); *G07F 17/3216* (2013.01); *G07F 17/322* (2013.01); *A63F 2003/00164* (2013.01)
  USPC ............. 273/309; 273/274; 273/292; 463/46; 463/47

(58) Field of Classification Search
  CPC ............ A63F 2003/00164; A63F 2003/00974; G07F 17/3216; G07F 17/322
  USPC ............... 273/309, 287, 274, 292; 463/46, 47
  See application file for complete search history.

(56) References Cited

U.S. PATENT DOCUMENTS

| | | | |
|---|---|---|---|
| 5,441,279 A * | 8/1995 | Messina | 273/309 |
| 8,279,262 B2 * | 10/2012 | Graham et al. | 348/14.1 |
| 2005/0093241 A1 * | 5/2005 | Lipscomb et al. | 273/309 |
| 2011/0305056 A1 * | 12/2011 | Chien | 363/178 |
| 2012/0129577 A1 * | 5/2012 | Vaknin et al. | 455/573 |

* cited by examiner

*Primary Examiner* — Benjamin Layno
(74) *Attorney, Agent, or Firm* — Salter & Michaelson

(57) ABSTRACT

A card table structure, preferably a poker table, includes a frame with legs for supporting the frame over a floor surface and a peripheral rail that extends about the table. A playing surface is disposed under the rail and extending across the rail to provide a surface upon which a card table game is to be played. A peripheral support member is secured under the rail. The peripheral support member includes a strip that extends about a major periphery of the table and for the support of plural power connectors for re-charging electronic devices directly at the card table structure.

13 Claims, 6 Drawing Sheets

US 8,888,101 B1

CARD TABLE

FIELD OF THE INVENTION

The present invention relates very generally to a card table, and more particularly to a poker table. The present invention also relates to the addition to the poker table structure of a connector strip that allows for the ready recharging of electronic devices, particularly of cell phones.

BACKGROUND OF THE INVENTION

Card games, and in particular poker, have become quite popular. These games can last for several hours. One major inconvenience is that any electronic devices occupied by a player cannot be recharged at the card table. Thus, this may require that the player leave the table for the purpose of recharging an electronic device such as a cell phone. It is typical to have a separate charging station that is not conveniently located relative to the card table.

Accordingly, it is an object of the present invention to provide a card table, and particularly a poker table, with the ability to recharge electronic devices directly at the table.

Another object of the present invention is to provide, associated with the card table, a peripheral support member that is comprised of a strip that extends about a major periphery of the table and for the support of plural power connectors for recharging electronic devices directly at the card table structure.

Still another object of the present invention is to provide a peripheral support member as previously identified and which can be either incorporated into the table during manufacture of the table or can be readily retrofitted to the card table.

SUMMARY OF THE INVENTION

To accomplish the foregoing and other objects, features and advantages of the present invention there is provided a card table structure comprising: a frame that includes legs for supporting the frame over a floor surface; the frame including a peripheral rail that extends about the table; a playing surface under the rail and extending across the rail to provide a surface upon which a card table game is to be played; and a peripheral support member secured under the rail; said peripheral support member comprised of a strip that extends about a major periphery of the table and for the support of plural power connectors for re-charging electronic devices directly at the card table structure.

In accordance with other aspects of the present invention the peripheral support member is in the form of a hollow channel member; the hollow channel member has spaced apart holes therein, each said hole for receiving one of the power connectors; the hollow channel member has inner and outer walls and the receiving hole is disposed in the outer wall so as to be accessible to a user for the purpose of re-charging electronic devices directly at the card table structure; the hollow channel member also has upper and lower walls with the upper wall thereof to be secured to the peripheral rail; further including a wooden strip secured to an underside of the rail and for supporting the hollow channel member thereunder, and a plurality of fasteners for securing the hollow channel member through the upper and lower walls thereof, through the wooden strip and into the peripheral rail; the plurality of fasteners are spacedly disposed about the periphery of the hollow channel member; each fastener comprises a screw and each of the screws is spaced apart from a receiving hole; including a wooden strip disposed between the hollow channel member and the peripheral rail, and a plurality of fasteners for securing the hollow channel member through upper and lower walls thereof, through the wooden strip and into the peripheral rail; the plurality of fasteners are spacedly disposed about the periphery of the hollow channel member; and each fastener comprises a screw and each of the screws is spaced apart from a receiving hole.

In accordance with the present invention in another version thereof there is provided a poker table constructed so that electronic devices can be readily re-charged directly at the poker table, said poker table constructed to include a frame that includes legs for supporting the frame over a floor surface and a peripheral rail that extends about the table, a playing surface under the rail and extending across the rail to provide a surface upon which a poker game is to be played, and a peripheral support member secured under the rail and comprised of a strip that extends about a major periphery of the table other than where a dealer is positioned and for the support of plural power connectors for re-charging electronic devices directly at the poker table.

In accordance with still other aspects of the present invention the peripheral support member is in the form of a hollow channel member that has spaced apart holes therein, each said hole for receiving one of the power connectors; the hollow channel member has inner and outer walls and the receiving hole is disposed in the outer wall so as to be accessible to a user for the purpose of re-charging electronic devices directly at the card table structure; the hollow channel member also has upper and lower walls with the upper wall thereof to be secured to the peripheral rail, and including a wooden strip secured to an underside of the rail and for supporting the hollow channel member thereunder; a plurality of fasteners are used for securing the hollow channel member through the upper and lower walls thereof, through the wooden strip and into the peripheral rail; the plurality of fasteners are spacedly disposed about the periphery of the hollow channel member; and each fastener comprises a screw and each of the screws is spaced apart from a receiving hole.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Reference is now made to FIGS. 1-6 for an illustration of a card table structure in accordance with the present invention.

Figure 1:
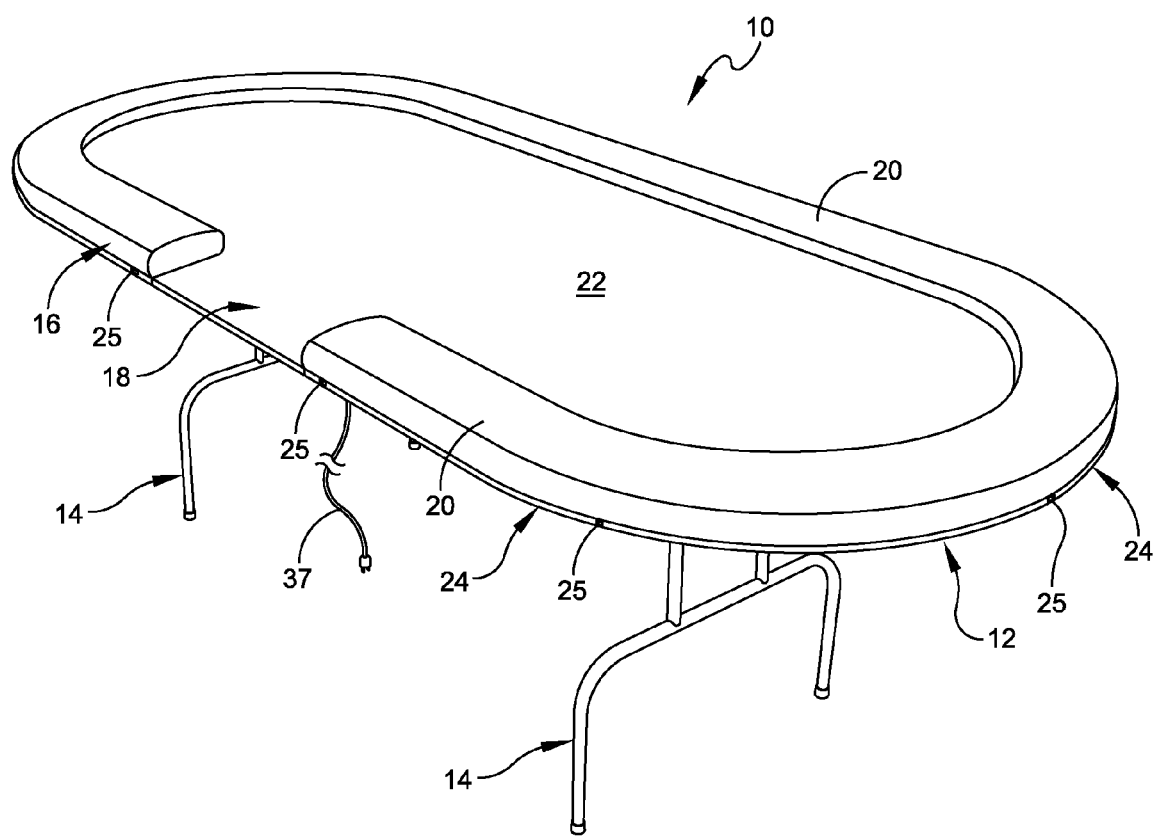
FIG. 1 is a perspective view of a poker table incorporating the peripheral support member of the present invention.

The principles of the present invention may be employed to virtually any card table structure, although, in the description of the present invention it is described primarily in association with a poker table 10, which is illustrated in a perspective view in FIG. 1. The principles of the present invention may be employed in connection with the construction of a variety of different configurations of card tables, one construction of which is described herein.

Figure 2:
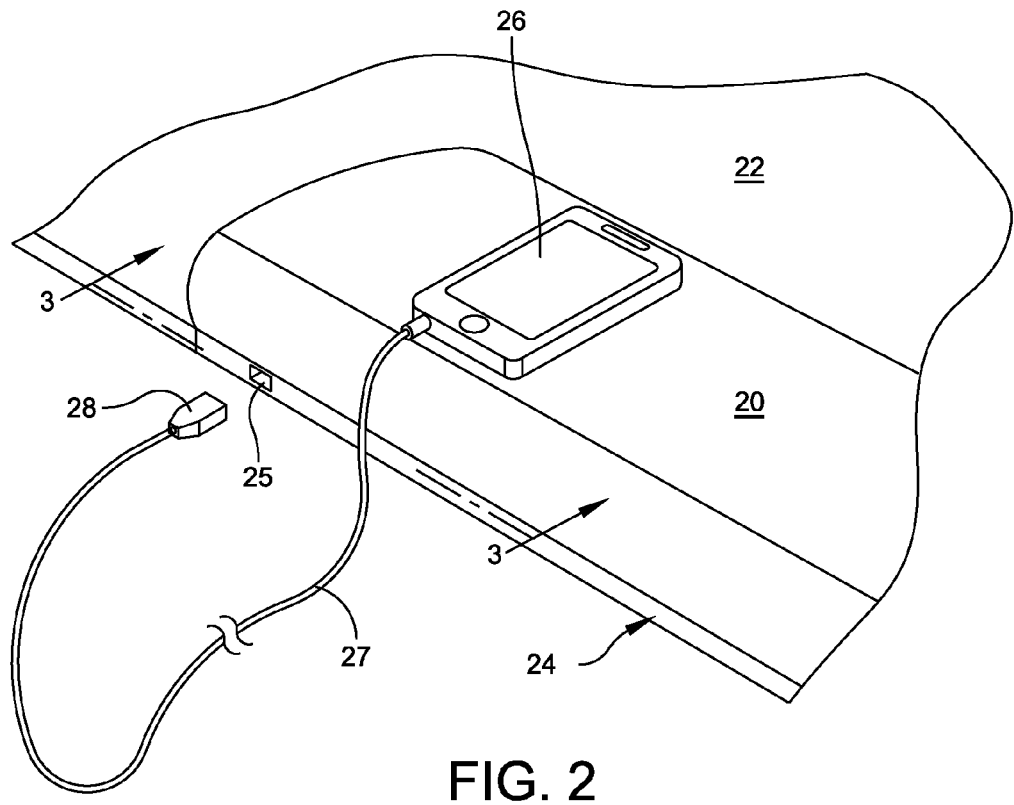
FIG. 2 is a fragmentary perspective view illustrating an electronic device about to be plugged into one of the connectors.

The card table structure is comprised of a frame 12 supported by means of a set of legs 14. The legs 14 are for supporting the frame over a floor surface as illustrated in FIG. 1. The frame includes a peripheral rail 16 that extends about the table. This rail is interrupted to provide an open space area 18 where the dealer typically is located. The perspective view of FIG. 1 shows a padding 20 that covers the rail 16. FIG. 1 also illustrates a plane surface at 22 that is basically under the rail and extends across the table to provide a surface upon which the card game is to be played. A peripheral support member 24 is illustrated in FIG. 1 under the rail and is comprised of a strip that extends about a major periphery of the table and which is for the support of plural power connectors 25. Each of these power connectors may be a conventional USB connector. In this regard, FIG. 2 illustrates a typical rechargeable electronic device such as a cell phone 26 that can be connected by way of a cord 27 to a connector part 28 that may be connected into the USB port 25.

Figure 3:
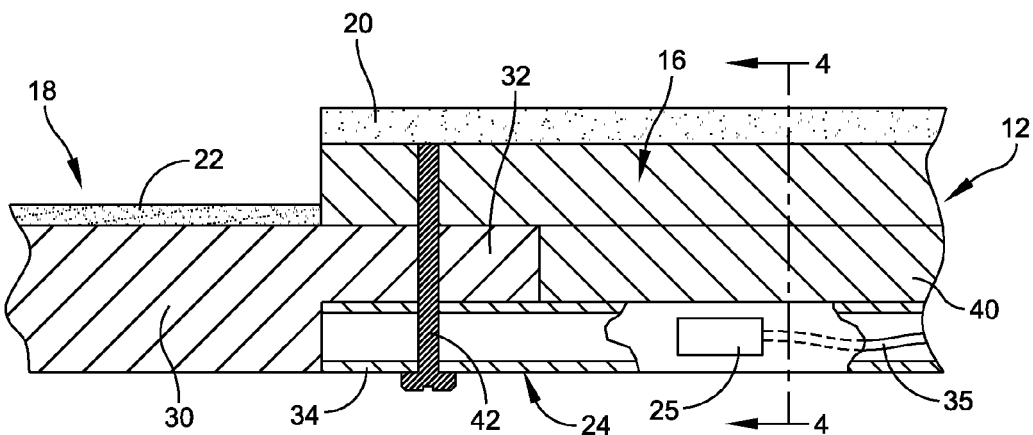
FIG. 3 is a cross-sectional view taken along line 3-3 of FIG. 2 showing further details of the table construction.
Figure 7:
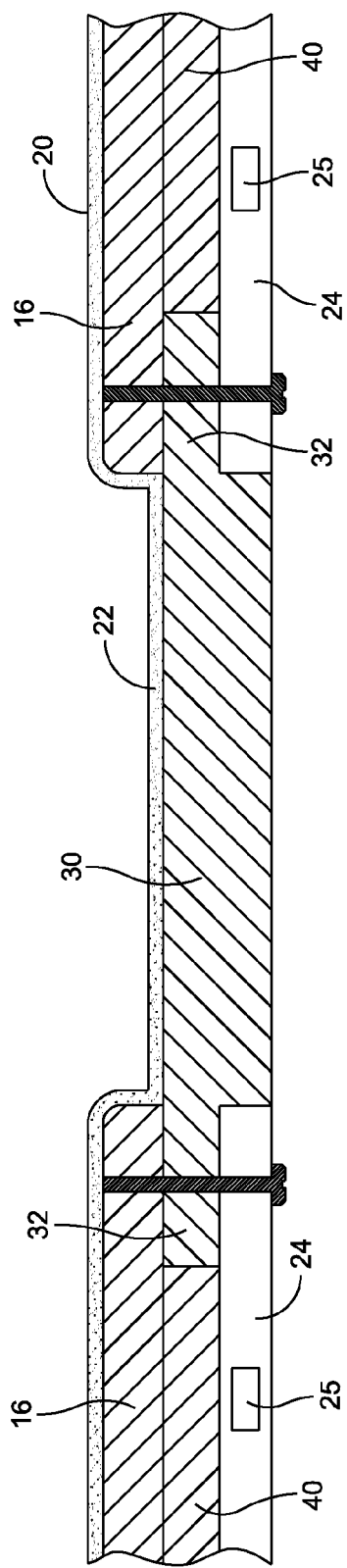
FIG. 7 is a fragmentary side elevation view at the dealer location.

Reference is now made to the fragmentary cross-sectional view of FIG. 3 which also illustrates a headpiece 30. Refer also to the side elevation view of FIG. 7 for an illustration of the headpiece 30, which is located at the opening 18 where the dealer is located. The headpiece 30 may be considered as of a T-shape having end extensions 32 that are adapted to a fittingly mate with ends of the peripheral support strip 24. In FIG. 3 an end 34 of the support strip 24 is engaged under the extension 32 of the headpiece 30. The headpiece 30 may be constructed of metal, wood, plastic, or other materials.

The cross-sectional view of FIG. 3 also illustrates that the peripheral support strip 24 is basically hollow, thus forming a channel for wiring 35 that runs throughout the channel of the strip 24 between various locations of the plug-in connectors 25. In this regard, refer also to the plan view of FIG. 5 that shows the interconnecting wiring 35 in dotted outline and also shows several locations of the connectors 25. This plan view of FIG. 5 also illustrates a convertor 36 that is used to convert normal AC voltage from the cord 37 (see FIG. 1) into a lower voltage for coupling to each of the connectors 25 by way of the wiring 35.

The construction of FIG. 3 also illustrates the rail at 16 and the overlying padding at 20 which may be in the form of a foam padding with a vinyl cover. Also illustrated in FIG. 3 is the peripheral wood strip 40, the configuration of which is also illustrated in the components diagram of FIG. 6. Refer also to the side elevation view of FIG. 7 that shows the wood strip 40 with the ends thereof butting up against the extensions 32 of the headpiece 30. FIG. 3 also illustrates one of a number of different fasteners at 42. The particular fastener of 42 shown in FIG. 3 may be in the form of a screw that extends through the peripheral support strip 24, through the extension 32 of the headpiece and into the rail 16. The rail 16 as well as the strip 40 may both be constructed of wood or other suitable materials. Preferably there are provided a plurality of fasteners 42 that attach the peripheral support strip 24 to the wood strip 40 and rail 16 about the entire periphery of the support strip 24. In connection with the plan view of FIG. 5, these fasteners may be disposed between adjacent connectors 25 so as not to interfere with the coupling of wiring to each of the connectors.

The rail 16 may have a width of, for example, 5 inches, while the width of the preferred wood strip 40 is less than 5 inches. The dealer opening at 18 is preferably 30"-36" wide. As indicated previously, the peripheral support strip 24 is hollow. It may have an internal dimension of ¾" by 1". The strip 24 is preferable constructed of a lightweight metal material but could also be constructed of a plastic material.

Figure 4:
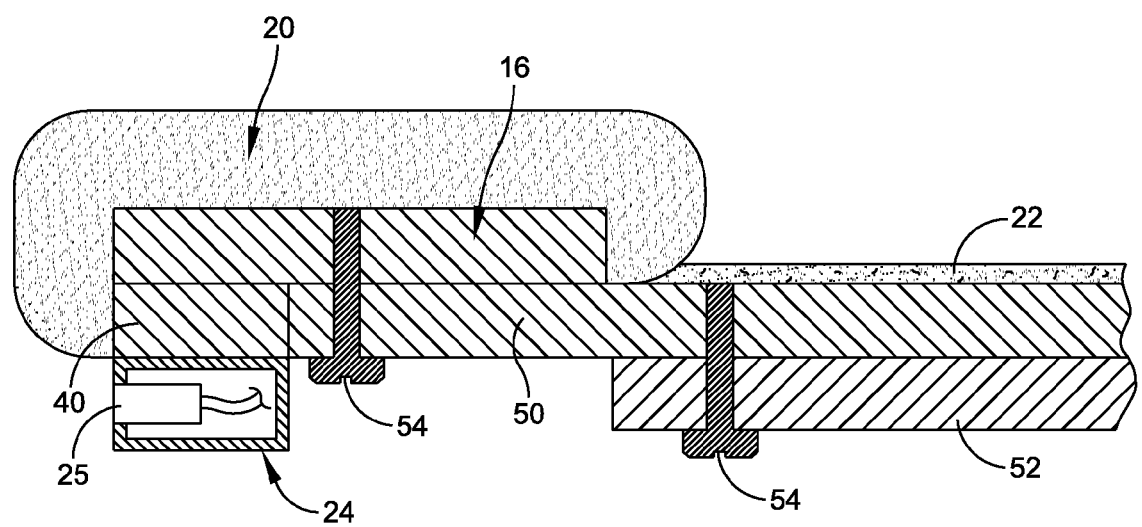
FIG. 4 is a cross-sectional view taken along line 4-4 of FIG. 3.
Figure 5:
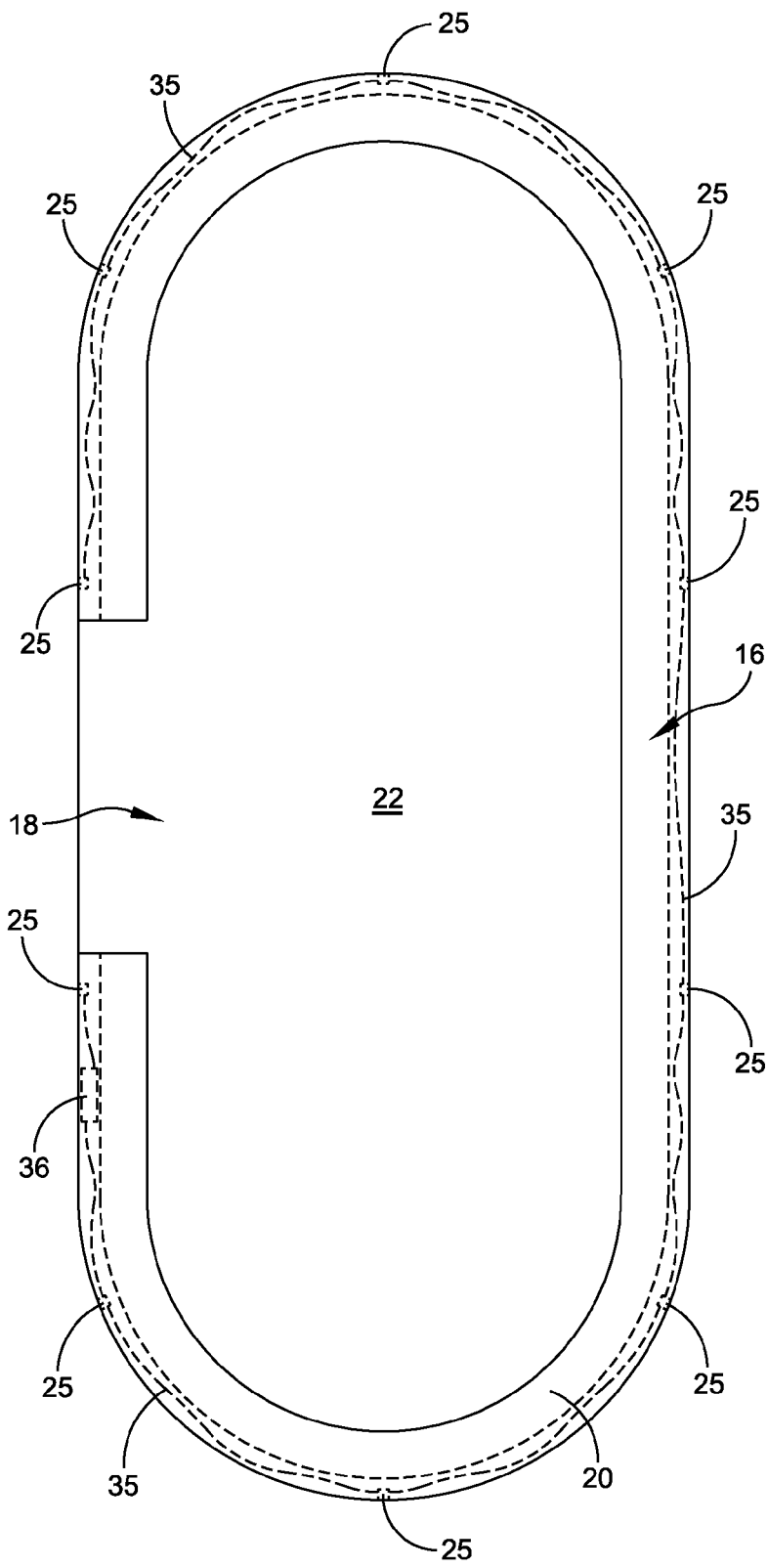
FIG. 5 is a plan view that illustrates the hollow support member and the associated wiring that interconnects the respective connectors.
Figure 6:
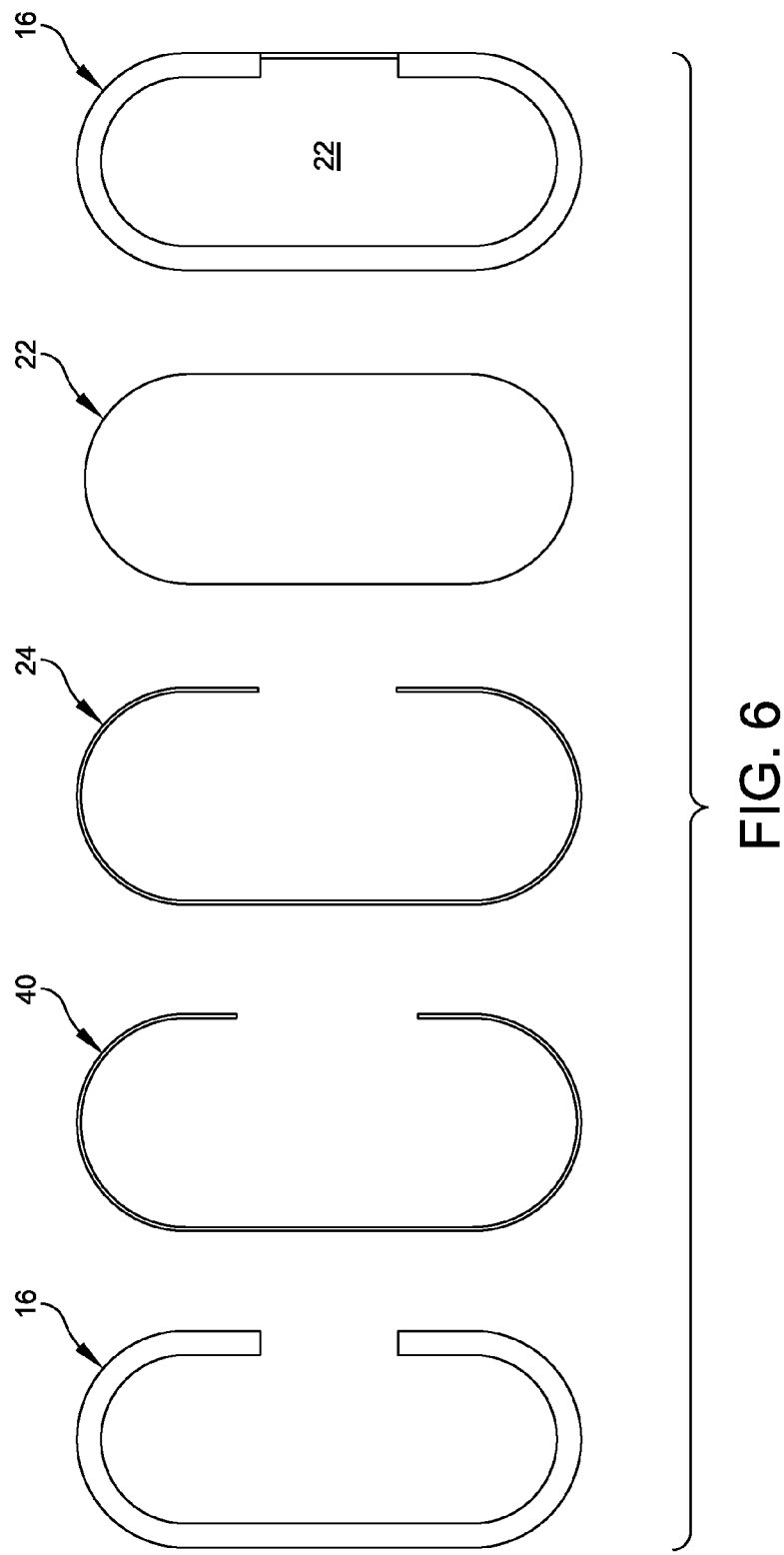
FIG. 6 illustrates the respective plan views of components employed in the table construction.

Reference is now made to the cross-section of FIG. 4 which is taken along line 4-4 of FIG. 3. The fragmentary cross-section view of FIG. 4 shows somewhat further details. In FIG. 4 there is illustrated the rail 16 and the strip 40. In addition, there are two further support pieces identified in FIG. 4 as members 50 and 52. Member 50 may extend across the full length and width of the table and is for support of the playing surface 22. Under the member 50 is a further support member 52. FIG. 4 also illustrates fasteners at 54 for securing together the various members of the table structure. One of the fasteners 54 extends through the member 50 into the rail 16. The other fastener 54 is shown extending through both of the members 50 and 52. A number of different fasteners may be used throughout the table structure spaced apart for securing together the various components that comprise the table structure.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A card table structure comprising:
   a frame that includes legs for supporting the frame over a floor surface;
   the frame including a peripheral rail that extends about the table terminating in respective free ends between which is defined an open space where the card dealer is located;
   a pad covering the peripheral rail;
   a playing surface under the rail and extending across the rail to provide a surface upon which a card table game is to be played;
   at least one planar member that extends across a full length and width of the card table structure and upon which is disposed the playing surface;
   a peripheral support member secured under the rail and having opposed free ends;
   a plurality of power connectors;
   said peripheral support member comprised of a strip that extends about a major periphery of the table and for the support of the plurality of power connectors for re-charging electronic devices directly at the card table structure;
   a headpiece that interconnects the free ends of the frame at the open space and that includes opposed extensions that overlie respective free ends of the peripheral support strip;
   wherein the peripheral support member is in the form of a hollow channel member;
   wherein the hollow channel member has a wall with a receiving hole disposed therein so as to be accessible to a user for the purpose of re-charging electronic devices directly at the card table structure;
   wherein the hollow channel member has spaced apart receiving holes therein, each said receiving hole for receiving one of the power connectors;
   wiring that extends through substantially the full length of the peripheral support strip and that interconnects the plurality of power connectors; and fastening means for connecting together the hollow channel member, the headpiece and the peripheral rail.

2. The card table structure of claim 1 wherein the fastening means comprises a plurality of fasteners that are disposed between adjacent power connectors so as not to interfere with the coupling of the wiring to each of the power connectors.

3. The card table structure of claim 2 wherein at least one fastener is connected through the headpiece extension, connecting, in sequence, through the peripheral support strip, through the extension and into the rail.

4. The card table structure of claim 3 wherein each fastener comprises a screw and each of the screws is spaced apart from a receiving hole.

5. The card table structure of claim 4 wherein at least some of the plurality of fasteners are disposed between adjacent power connectors so as not to interfere with the coupling of the wiring to each of the power connectors.

6. The card table structure of claim 5 including a wooden strip secured to an underside of the rail and for supporting the hollow channel member thereunder, wherein said hollow channel member includes inner and outer walls and top and bottom walls, wherein the wooden strip has a height substantially the same as a height each of the opposed extensions, and wherein the hollow channel member has a height substantially the same as the height of the wooden strip.

7. The card table structure of claim 1 including a first planar member that extends across a full length and width of the card table structure and is for support of the playing surface.

8. The card table structure of claim 7 wherein the fastening means comprises a plurality of fasteners including at least one fastener that extends through the planar member and into the rail.

9. The card table structure of claim 8 including a second planar member disposed under the first planar member.

10. The card table structure of claim 9 wherein one of the plurality of fasteners includes at least one fastener that extends into both first and second planar members.

11. The card table structure of claim 10 including a convertor that is used to convert normal AC voltage from an electrical cord into a lower voltage for coupling to each of the power connectors by way of the wiring.

12. The card table structure of claim 11 wherein at least one fastener is connected through the headpiece extension, connecting, in sequence, through the peripheral support strip, through the extension and into the rail.

13. The card table structure of claim 12 wherein at least some of the plurality of fasteners are disposed between adjacent power connectors so as not to interfere with the coupling of the wiring to each of the power connectors.

\* \* \* \* \*